United States Patent [19]

Tyler

[11] 4,176,063
[45] Nov. 27, 1979

[54] WATER PURIFIER SYSTEM AND VALVE

[75] Inventor: Truman V. Tyler, Grass Valley, Calif.

[73] Assignees: Richard W. Beall, Jr., Manhattan Beach; Robert B. Sprague, Long Beach; Louis J. Favara, Thousand Oaks; Gausewitz, Carr & Rothenberg, Orange, all of Calif. ; part interest to each

[21] Appl. No.: 844,374

[22] Filed: Oct. 21, 1977

[51] Int. Cl.² .............................................. C02B 1/82
[52] U.S. Cl. .................... 210/101; 210/103; 210/118; 210/321 R; 210/257.2
[58] Field of Search .................. 210/23, 21, 101, 103, 210/104, 136, 257 M, 118, 321 R; 137/625.18, 625.19, 632.2, 637, 625.47, 593

[56] References Cited

U.S. PATENT DOCUMENTS

| | | | |
|---|---|---|---|
| 2,556,539 | 6/1951 | Hellberg | 210/118 X |
| 3,493,495 | 2/1970 | Mendelson | 210/23 |
| 3,493,496 | 2/1970 | Bray et al. | 210/23 |
| 3,498,910 | 3/1970 | Mendelson | 210/23 |
| 3,504,796 | 4/1970 | Bray | 210/137 |
| 3,568,843 | 3/1971 | Brown | 210/321 R |
| 3,630,378 | 12/1971 | Bauman | 210/257 M |
| 3,679,055 | 7/1972 | Clark et al. | 210/257 M |
| 3,679,911 | 7/1972 | Kaufman | 307/251 |
| 3,688,911 | 9/1952 | Baerg | 210/321 R |
| 3,719,593 | 3/1973 | Astil | 210/136 X |
| 3,726,793 | 4/1973 | Bray | 210/23 |
| 3,735,604 | 5/1973 | Astl | 62/316 |
| 3,746,640 | 7/1974 | Bray | 210/23 |
| 3,794,172 | 2/1974 | Bray | 210/257 M |
| 3,794,173 | 2/1974 | Bray | 210/257 M |
| 3,831,757 | 8/1974 | Gossett et al. | 210/321 R |
| 3,887,463 | 6/1975 | Bray | 210/110 |
| 3,959,146 | 5/1976 | Bray | 210/257 M |
| 3,966,119 | 6/1976 | Harter et al. | 137/625.47 |
| 4,077,883 | 3/1978 | Bray | 210/136 |

Primary Examiner—John Adee
Attorney, Agent, or Firm—Richard L. Gausewitz

[57] ABSTRACT

An economical and commercially practical reverse-osmosis water purifier system which has no back pressure acting against the semipermeable membrane, so that the filtering rate is maximized. Furthermore, the supply of tap water to the system is shut off automatically as soon as the pure water storage tank is full, use of water thus being greatly reduced. These, and other major advantages, are achieved despite the fact that there is only a single tube extending to the faucet, automatic ice-maker, refrigerated drinking fountain or other point of use.

The system uses rugged, long-lasting and economical diaphragm valves, which eliminates the need for sliding seals. Thus, it becomes highly practical to injection-mold the valves of plastic.

The long-standing major problem of plugging or fouling of the constricted outlet for waste water is eliminated at low cost and with very little use of water. What water is used provides not only cleaning of the constriction region but also a partial flushing of the filter membrane. These results are achieved by means of a self-cleaning constrictor valve having a predetermined flow area which may be made as small as the manufacturer desires.

In one embodiment, a valve is provided to automatically stop the outflow of squeeze water while the faucet is in open condition. This saves additional water and also makes it possible to build up a relatively high pure-water pressure even when the inlet pressure is less than average.

36 Claims, 9 Drawing Figures

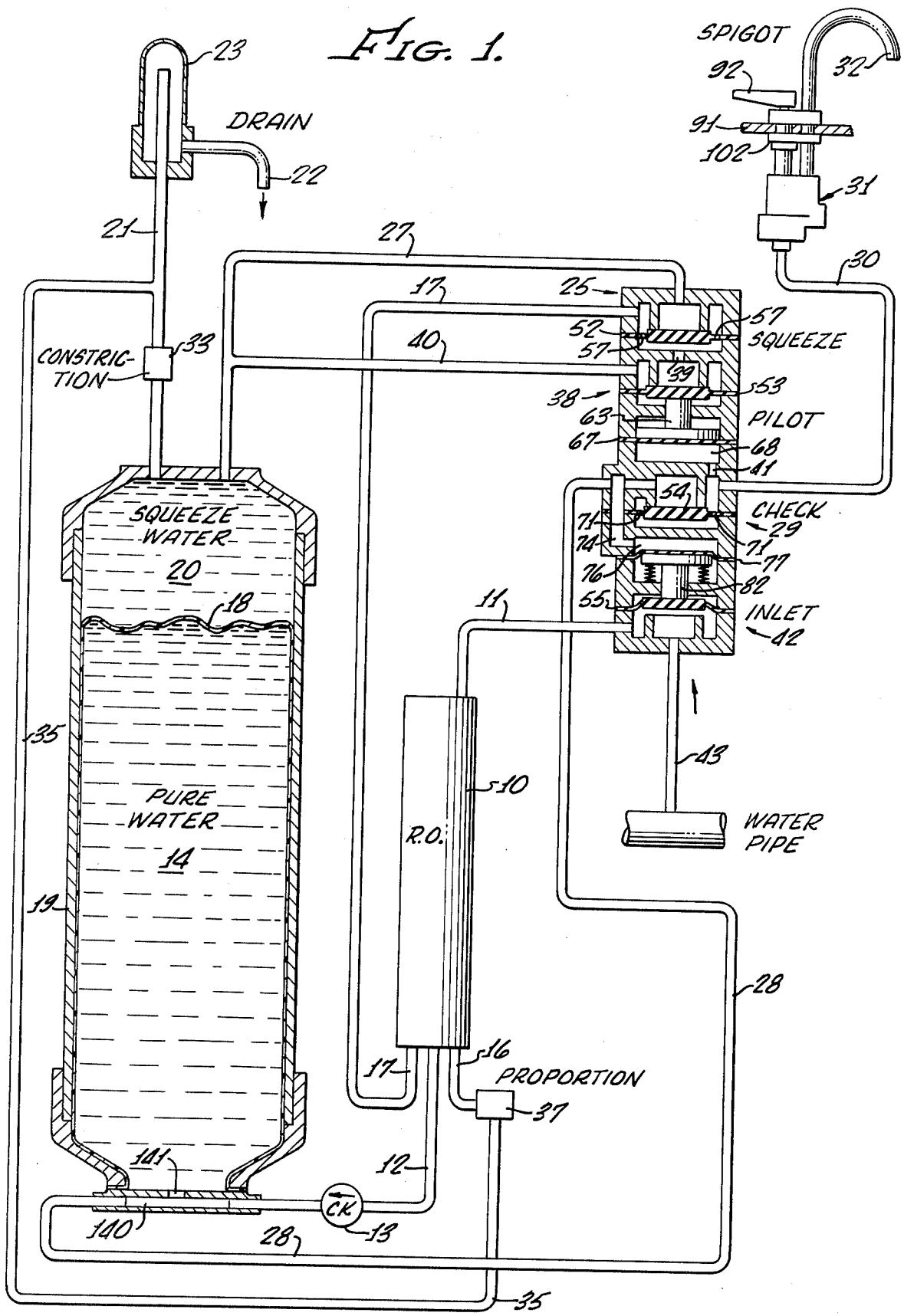

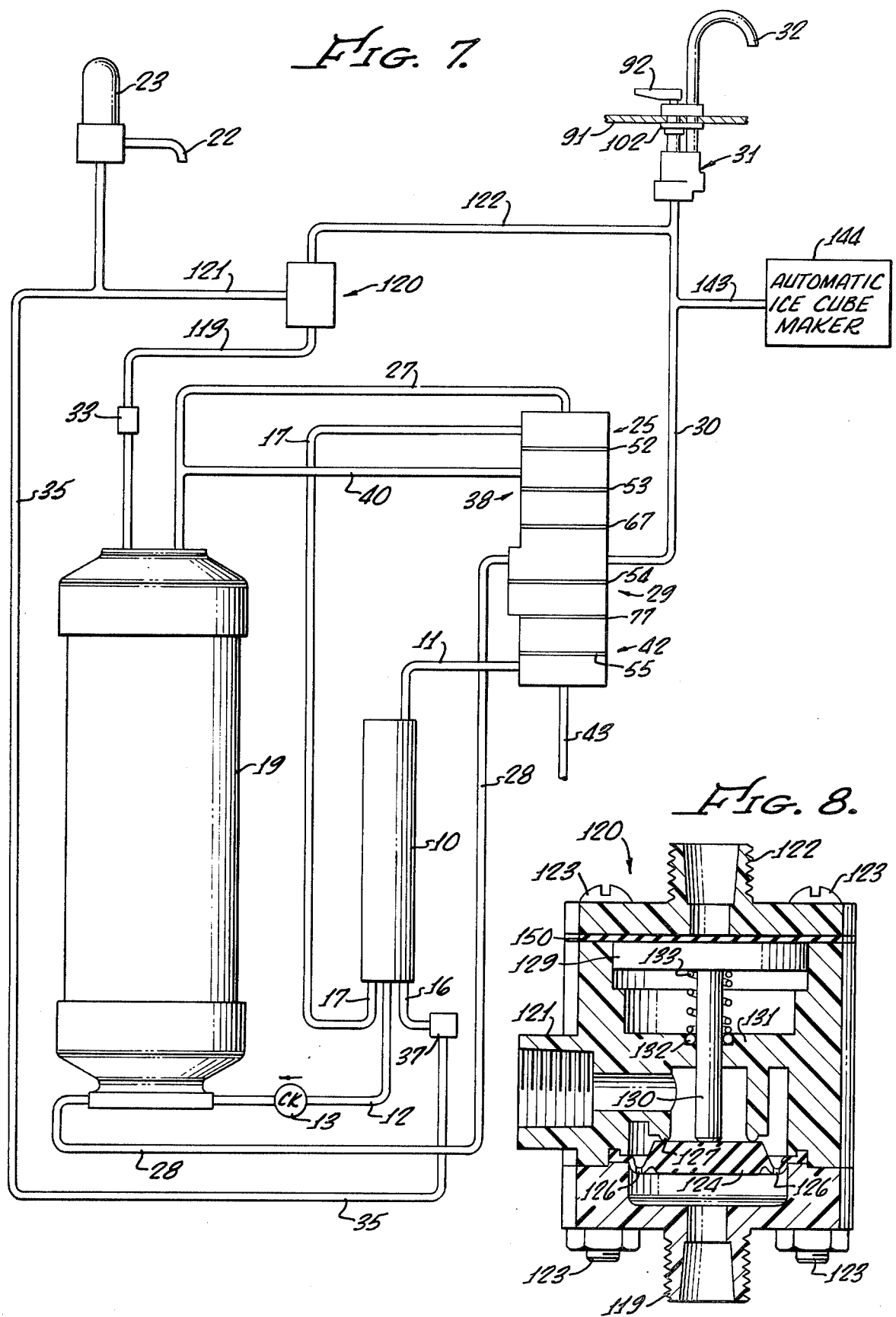

WATER PURIFIER SYSTEM AND VALVE

BACKGROUND OF THE INVENTION, AND DESCRIPTION OF PRIOR PATENTS

In my earlier U.S. Pat. No. 4,021,343, issued May 3, 1977, there is shown and described an automatic water purifier system requiring no electricity. The water is always fully enclosed, so that it is not exposed to insects or air-borne bacteria. There is no back pressure on the membrane, nor is there wastage of water after the pure water tank is full.

However, the above and other advantages set forth in U.S. Pat. No. 4,021,343 were achieved at the expense and inconvenience of having: (a) at least three tubes to the spigot (faucet) assembly, and (b) two manually-operated valves in such assembly. When three tubes are thus used, it becomes difficult or impossible to locate the spigot at a substantial distance from the remainder of the system. Thus, for example, piping of the pure water to the automatic icemaker in a household refrigerator is usually not feasible. The use of pure water in icemakers not only prevents the ice from being bad-tasting but also causes it to be clear and unclouded.

A single-tube system having the advantages stated in U.S. Pat. No. 4,021,343 has now been achieved. Furthermore, the present purifier system is much more simple, economical, rugged, reliable and maintenance-free than is that described in the patent.

A very great problem present in my earlier system, and in all other earlier systems having any degree of practicality, is that of fouling of the waste outflow constrictor. It is required by the manufacturer of standard reverse-osmosis filters that there be at least a certain ratio of water which does not pass through the membrane to water which does pass therethrough, this ratio being achieved by use of a properly-sized constrictor in the waste-water outlet. The waste water contains salts and other impurities flushed from the membrane, and usually flows for at least several hours each day. Therefore, the constricted region tends to plug or clog and prevent the system from operating properly.

Many efforts have been made to solve the clogging problem. Use has been made, for example, of long volute passages having flow cross-sections relatively large in comparison to that of an orifice. As another example, resort has been had to a balanced valve in which a needle element seats axially on a valve seat. Beds of particulate material have been proposed. These and other attempts have been impractical or unsuccessful.

In the present water purifier, there is automatic, fully effective and rapid cleaning of a constricting outflow valve each time the spigot is opened while the storage bladder is full. This occurs sufficiently often to insure that clogging will not be any problem, but sufficiently seldom to prevent substantial wastage of water. Very importantly, the flow area remains at a precise, predetermined value at all times when constriction is desired.

Another major problem in most earlier systems (not the one specified in the cited patent) is that there is a substantial back pressure against the membrane. Therefore, for a given input pressure there will be a reduced pressure differential across the membrane—retarding the rate of filtration. Particularly since (as discussed below) a standard commercial filter requires many minutes to generate one glass of water, even when there is no back pressure, it will be understood that a lessening of this filtering rate is distinctly undesirable.

Many earlier systems (not the one described in the patent) cause waste water to pass through the reverse-osmosis unit twenty-four hours a day. This is, of course, a horrendous waste of water. In addition, the continuous water flow exacerbates the clogging problem discussed above.

It is common in earlier systems to use metal valves having piston or other sliding elements sealed by O-rings. Although O-rings are often satisfactory in many types of machinery, they are unsatisfactory as sliding seals in almost all parts of household water purifier systems. There are two reasons for this, the first being that O-rings (and comparable seals) tend to freeze or stick, thus preventing the system from operating. Secondly, O-rings (in systems where there are low pressure differentials) are best used with metal parts the diameters of which are precise and do not change excessively with temperature. Commercial plastic, which can be cheaply injection-molded, changes diameter—with temperature—to an excessive degree usually making O-rings impractical in water purifiers.

The present system is substantially all plastic, and uses no sliding seals (O-rings or otherwise) except in one part of the second embodiment. The water never "sees" any metal until the stainless-steel spout is reached. The highly-sensitive diaphragm valves cannot stick, and have great reliability and life.

Earlier systems (including the one set forth in the patent) do not block the escape of certain waste water (the pressurizing or "squeeze" water) to the drain during the time when the spigot is open. Such a shut-off, which is achieved by a valve in the second embodiment of the present invention, makes the unit more practical and effective in water-scarcity and/or low water-pressure regions.

SUMMARY OF THE INVENTION

A single tube extends to the spigot (or icemaker, etc.) from the pure water storage tank, and contains a check valve which maintains pressure at the spigot when such storage tank is depressurized for maximized filtering speed. When the spigot is opened, the drop in water pressure in the tube opens a valve which passes squeeze water to the depressurized tank, whereupon it pressurizes to force pure water out the spigot. When the storage tank is full of pure water, a valve is closed automatically, thus preventing further flow of water to the drain so that water use is reduced.

Stated more specifically, the opening of the spigot operates a pressure-responsive pilot valve which in turn opens a squeeze-control valve. These valves, and also the check valve, and the valve which shuts down water flow when the storage tank is full of pure water, are economical, sensitive and rugged diaphragm valves. Thus, no sliding seals (such as, for example, O-rings) are required, and the valves can be injection molded.

There may be any desired ratio of pure water versus waste water emanating from the reverse-osmosis filter unit contained in the system. The ratio may be maintained with precision—even when such ratio is very small—since the waste water passes through a self-cleaning constricted outlet not subject to continued clogging or plugging by salts and other contaminants. The outlet is defined by first and second wall elements when such elements are adjacent each other. The wall elements are periodically separated and then cleaned by temporary flow of increased-velocity waste water. The indicated increased flow also aids in flushing the filter membrane.

Stated more specifically, the first and second wall elements are on a movable valve element and its seat. Means are provided to lift the movable element off its seat when two conditions occur simultaneously: (a) the storage tank is full of pure water, and (b) the spigot is opened. This happens—at the very least—once a day when the system is in use, so the combined constrictor-cleaning and filter-flushing actions occur sufficiently often to insure against any prolonged blockage but sufficiently seldom to minimize water use.

In accordance with one embodiment, water wastage is further reduced and (squeeze pressure increased) by adding to the system a valve which automatically blocks depressurizing flow of squeeze water from the storage tank when the spigot is in open condition.

The present system is believed to be the first commercially practical, economical, rugged and long-lasting household water purifier—and is one wherein the flow of waste water can be held accurately at a reasonable level required by the manufacturer of the filter unit in order to guarantee the same.

BRIEF DESCRIPTION OF THE DRAWINGS

FIG. 1 is a schematic view showing the first embodiment of the present water purifier system, the valve means being shown schematically in longitudinal section;

FIG. 7 is a schematic view of a second embodiment of the present invention, in which valve means are provided to prevent flow of any squeeze water to the drain during the period when the outlet valve is open; and FIG. 8 is a greatly enlarged longitudinal sectional view showing, in closed condition, the last-mentioned valve.

DESCRIPTION OF THE PREFERRED EMBODIMENTS

Figure 3:
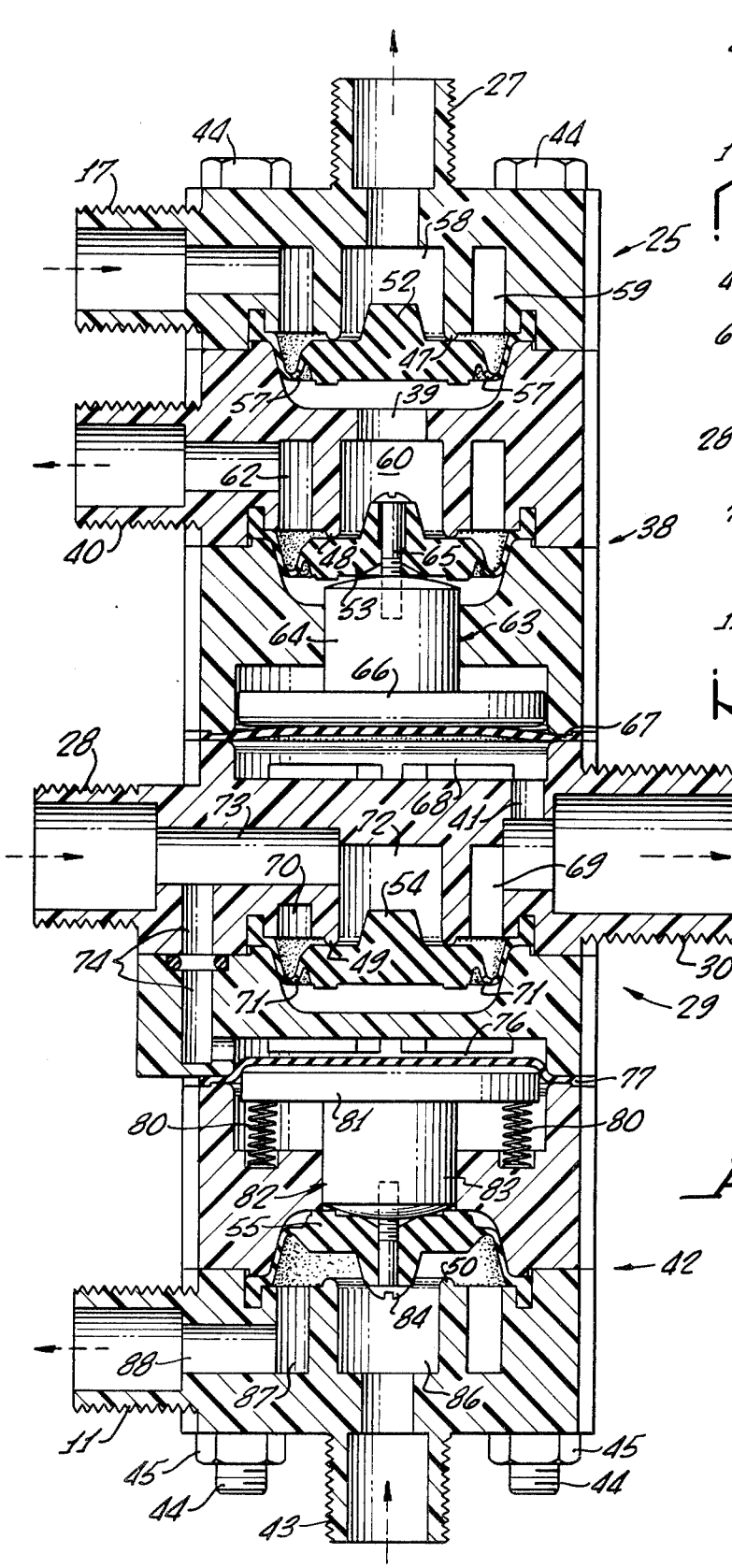
FIG. 3 is a greatly enlarged longitudinal sectional view on line 3—3 of FIG. 2.

Referring to FIG. 1, the water purifier system is shown schematically and will first be described in a general manner.

The reverse-osmosis filter unit 10 (labeled "R.O.") is of conventional type, the preferred unit being obtainable from Universal Oil Products Co. of San Diego, California. "Tap" water (household water at line pressure) enters through a tube 11 into the upper end of unit 10 and then follows two paths to outlets at the lower end. One path is through the semipermeable reverse-osmosis membrane contained in unit 10. Such water is thus purified and then passed through a pure water outlet tube 12 and a check valve 13 to a pure water chamber 14.

The remaining water from tube 11 flows through R.O. unit 10, to outlet tubes 16 and 17, without passing through the membrane. This water instead flushes impurities from the membrane so as to clean the same. The "waste" water (brine) resulting from this flushing operation is substantially at line pressure.

Pure water chamber 14 is in a bladder 18, the bladder being adapted when fully expanded to conform to the interior of a tank 19 which is sufficiently strong to withstand substantially full line pressure. Bladder 18 is shown in its condition prior to the time it is fully expanded, to better illustrate a squeeze chamber 20 located in tank 19 exteriorly of the bladder.

Squeeze chamber 20 communicates through a tube 21 with a suitable drain 22, and this may occur through a conventional air-gap device 23 adapted to prevent any possible suction effects.

One waste-outlet tube (number 17) from R.O. unit 10 connects to a squeeze valve 25 and thus, via a tube 27, to squeeze chamber 20. Since the water in tube 17 is substantially at line pressure, when squeeze valve 25 is open the water in squeeze chamber 20 is pressurized in order to exert an inward force through bladder 18. Pure water from chamber 14 then flows through a tube 28 to a check valve 29 (such valve also playing a part, as described below, in the controlling of squeeze valve 25). The pure water then passes through a single tube 30 to a manually-controlled faucet or spigot (outlet valve) 31 having a spout 32.

During the time that squeeze chamber 20 is thus pressurized to expel pure water through spout 32, the outflow of squeeze water to drain 22 is maintained at a low level by means of a constrictor 33 provided in tube 21. However, such constrictor is positioned so as not to constrict flow of waste water to drain 22 from an additional tube 35. Such tube 35 connects through a proportioning valve 37 to the remaining waste-outlet tube 16 from R.O. unit 10.

As will be described in detail relative to FIGS. 6 and 6a, the proportioning valve 37 has a substantially fail-proof self-cleaning action and makes sure that there will be the desired proportion between flushing or waste water emanating from the R.O. unit through tube 16, and pure water emanating therefrom through tube 12. Flows through tubes 12 and 16 continue at substantially all times except when bladder 18 is full, whereas flow through the remaining tube 17 only occurs during periods when spigot 31 is open.

Operation of squeeze valve 25 is controlled by a pilot valve 38 which communicates therewith through a port 39. Pilot 38, and thus squeeze valve 25, are further controlled by the above-mentioned check valve 29. The latter valve communicates with the pilot valve through a port 41. Pilot valve 38 connects through a tube 40 to tube 27 and thus to a suitable "drain" region such as squeeze chamber 20. The pilot 38 could also be connected to discharge directly to element 22, but this is not preferred in that the squeeze action at chamber 20 is then reduced.

An inlet valve 42 controls the flow of tap water from an inlet tube 43 to tube 11 and thus the R.O. unit (tube 43 being connected to a household water pipe containing tap water at line pressure). Valve 42 is normally open, but is closed in response to complete filling of bladder 18. When valve 42 thus closes, the pressure in R.O. unit 10 drops to substantially zero since tube 16 communicates continuously, through a constricted passage in valve 37, to tube 35 and thus to drain 22.

DETAILED DESCRIPTION, EMBODIMENT OF FIGS. 1 THROUGH 6a, INCLUSIVE

Figure 2:
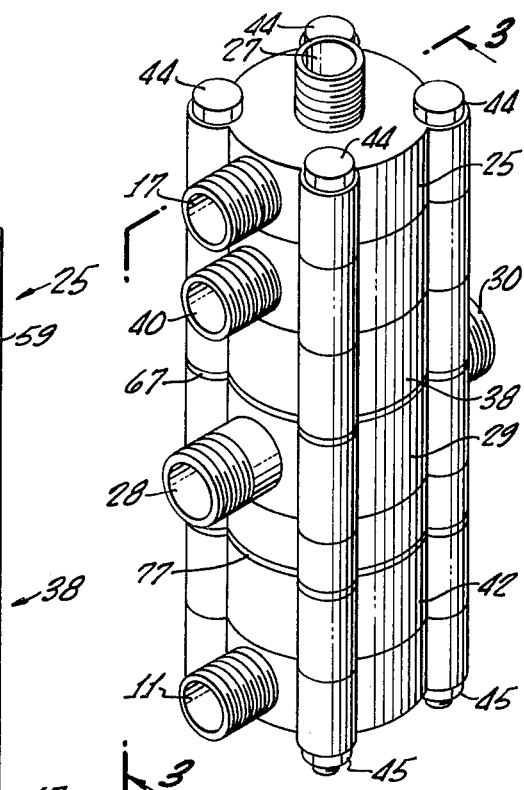
FIG. 2 is an isometric view showing the exteriors of the actual squeeze, pilot, check and inlet valves.

Referring to FIGS. 2 and 3, the construction of valves 25, 29, 38 and 42 is shown in nonschematic manner. These valves are preferably plastic and are composed of layers stacked together as illustrated, being secured in clamped relationship by means of four elongated clamp bolts 44 and associated nuts 45. For convenience of reference, the fittings on the various valves (and which are molded integrally therewith) are given the same reference numbers as the respective tubes (FIG. 1) to which they connect. (A presently preferred size of the unit is such that bolts 44 are about 1⅛ inches from each other—measured along the sides of the valve, not diametrically—whereas the length of the stack is about 4½ inches. These dimensions are given by way of example only, not limitation.)

The three valves 25, 29 and 38 incorporate identical annular valve seats 47, 48 and 49 which face downwardly. The seat of the fourth valve, number 42, is also identical and is numbered 50, but the latter seat faces upwardly in the illustrated embodiment.

Disposed below seats 47–49 are diaphragms 52–54, respectively. The fourth diaphragm, number 55, faces in the opposite direction and is disposed over seat 50. Each of the diaphragms is preferably of the illustrated bellows type, and each has a peripheral sealing portion which is locked between adjacent plastic portions of the valves when the various layers which form the valves are assembled on the bolts 44. The diaphragms 52, 53, 54, 55 are substantially identical to each other, except as stated below, and each is preferably formed of a suitable elastomeric material such as rubber or a synthetic resin formulation.

There will first be described the squeeze valve 25, best shown in FIG. 3, such valve being so named because when it is open there will be a flow of pressurized water to squeeze chamber 20 (FIG. 1) to apply pressure to bladder 18. The above-described diaphragm 52 of valve 25 has small ports or holes 57 formed therethrough at locations radially outwardly of seat 47. For example, there may be two such ports and each may have a diameter of 0.025 inch.

A cylindrical valve chamber 58 above diaphragm 52 communicates with the squeeze chamber 20 through tube 27. An annular valve chamber 59 outwardly of seat 47 communicates with tube 17 and thus with one of the waste-water outlets of R.O. unit 10. The portion of squeeze valve 25 below diaphragm 52 communicates through the relatively large port 39 (having a flow area much larger than the combined areas of diaphragm ports 57) with a valve chamber 60 in pilot valve 38. Chamber 60 is over the diaphragm 53 of such pilot valve. Diaphragm 53 does not have any ports therein. At its upper side, radially outwardly of seat 48, is an annular chamber 62 which connects through tubes 40 and 27 to squeeze chamber 20.

A piston means 63 is mounted beneath diaphragm 53 for limited vertical movement. The rod portion 64 of the piston means presses against the underside of diaphragm 53 at the central region thereof and may be secured to the diaphragm as by a screw 65. The large-diameter piston portion 66 of piston means 63 presses against the upper side of a diaphragm 67 which is nested sealingly between two adjacent ones of the plastic valve components (layers) in the described stack. Diaphragms 53 and 67 cooperate to prevent ingress of water into engagement with piston means 63.

A pressure chamber 68 formed below diaphragm 67, and having a large diameter, communicates through the above-indicated port 41 with the tube 30 leading to spigot 31. Such tube 30 also communicates through a passage 69 with an annular chamber 70 in check valve 29 above the diaphragm 54 of such valve. Water can thus flow slowly through small ports or holes 71 which are provided in diaphragm 54, radially outwardly of seat 49. As in the case of ports 57 in squeeze valve diaphragm 52, there may be two ports 71 in diaphragm 54 and each may have a diameter of 0.025 inch.

The chamber 72 in valve 29, above diaphragm 54, connects through a passage 73 with the tube 28 leading directly to pure water chamber 14. Passage 73 and tube 28 also communicate through aligned passages 74 with a relatively large-diameter chamber 76, the lower side of which is defined by a diaphragm 77.

Check valve 29 closes in response to closing of spigot 31, since the pure water being passed through the tube 30 from chamber 14 and tube 28 backs up through the small holes 71 and pressurizes the valve region beneath diaphragm 54, forcing the diaphragm upwardly against its seat 49. The water in tube 30 is thus maintained under pressure even after the inlet valve 42 (described below) closes and flow of squeeze water ceases.

It is to be noted that the check valve is active only when the water pressure in bladder 18 is less than that in tube 30. After the bladder becomes full, the bladder pressure eventually exceeds the tube pressure, causing the pressures on both sides of diaphragm 54 to be substantially equal so that there is then no force causing the diaphragm to seat.

Not only does check valve 29 maintain pressure in tube 30 and spigot 31 when bladder pressure is low, but check valve closing permits pressure to be transmitted immediately through port 41 into pressure chamber 68 and thus exert an upward force through diaphragm 67 against the piston portion 66 of piston means 63. Rod portion 64 is thus elevated to move pilot diaphragm 53 upwardly against its seat. When diaphragm 53 seats, water cannot drain from squeeze valve 25 through port 39. It follows that water (at substantially line) pressure from tube 17 will flow through the small diaphragm ports 57 into the space below diaphragm 52, pressurizing the regions below such diaphragm and forcing it upwardly against its seat 47. This prevents further flow of squeeze water to chamber 20.

In summary, therefore, closing of check valve 29 at least aids in effecting closing of pilot valve 38, and closing of the pilot valve causes closing of squeeze valve 25 to shut down the flow of squeeze water.

It has been found, surprisingly, that no spring or other bias means are required in pilot valve 38. Instead, the pilot diaphragm 53 is forced downwardly off its seat (as described below) by the pressure of water passing through the small ports 57 in squeeze-valve diaphragm 52. There is no "hunting", "motorboating", or other unstable operation of the pilot valve.

Proceeding next to the inlet valve 42, shown at the lower portion of FIG. 3, this includes the above-indicated diaphragm 55 which faces oppositely to the other three diaphragms 52–54. Diaphragm 55 is shown as spaced away from its seat 50, since this is the position of inlet valve 42 while the unit is filling. The diaphragm 55 is normally held away from seat 50 not only by pressure of inlet water from tube 43 but also by spring means which are preferably three small-diameter helical compression springs 80. These springs 80 are disposed at 120-degree intervals, and press upwardly against a large-diameter piston portion 81 of a piston means 82, such piston portion being disposed immediately beneath the diaphragm 77. The rod portion 83 of piston means 82 engages the upper surface of diaphragm 55 at regions above seat 50, being secured to such diaphragm by a screw 84.

A valve chamber 86 in valve 42, beneath the central region of the diaphragm, communicates with inlet tube 43. The valve also incorporates an annular chamber 87 which connects through a passage 88 with tube 11 leading to the inlet of R.O. unit 10. Thus, when the valve is fully open as illustrated, there is a direct, clear passage between chambers 86 and 87 and thus to the R.O. unit. Conversely, when diaphragm 55 is seated on seat 50, flow to the R.O. unit is blocked. This shuts down all flow of water and prevents waste.

Inlet valve 42 is only closed during periods when the bladder 18 is completely full. At that time, bladder 18 presses against the entire interior surface of tank 19, and pressure builds up in chamber 14 in response to the slow ingress of purified water from R.O. unit through check valve 13. This pressure is finally sufficient to overcome the upward bias of springs 80, and the line pressure on the lower side of diaphragm 55, and force diaphragm 55 downwardly onto its seat 50. Stated more specifically, the pressure thus built up in chamber 14 communicates through tube 28 and passages 74 to pressure chamber 76, creating a downward force through diaphragm 77 against large-area piston portion 81 to overcome the spring bias (and line pressure) and force piston means 82 downwardly together with diaphragm 55 so that the latter seats.

The relationships are caused to be such that inlet valve 42 does not close in response to flow of squeeze water. When squeeze water is passing through valve 25 from R.O. unit 10 to squeeze chamber 20, the bladder 18 is pressurized to expel water through tube 28 and check valve 29 to the spigot 31. There is, therefore, a certain reduced pressure in passage 73 ("reduced" because the spigot 31 is then open), and this pressure is communicated downwardly through passages 74 to chamber 76 above piston 81. However, and despite the fact that the piston 81 is large in diameter, this reduced pressure is not sufficient to overcome springs 80 (plus line pressure) and close inlet valve 42. It is to be noted that if the valve 42 were to close at this time, there would not be any squeeze water flow through tubes 11 and 17 and thus through squeeze valve 25 to the squeeze chamber.

Springs 80, which cooperate with the inlet line pressure in maintaining valve 42 normally open, perform the function of preventing unstable valve operation; namely, repeated opening and closing which may be termed hunting, motorboating or chatter.

It is a feature of the inlet valve 42 that the piston means 82 and its associated springs 80 are not contained in water, the water being sealed out by diaphragms 55 and 77. As in the case of screw 65 and its associated diaphragm 53, diaphragm 55 serves as a seal preventing leakage of water around the screw 84. As above stated, the water in the present purifier never contacts metal until spout 32 is reached.

Figure 4:
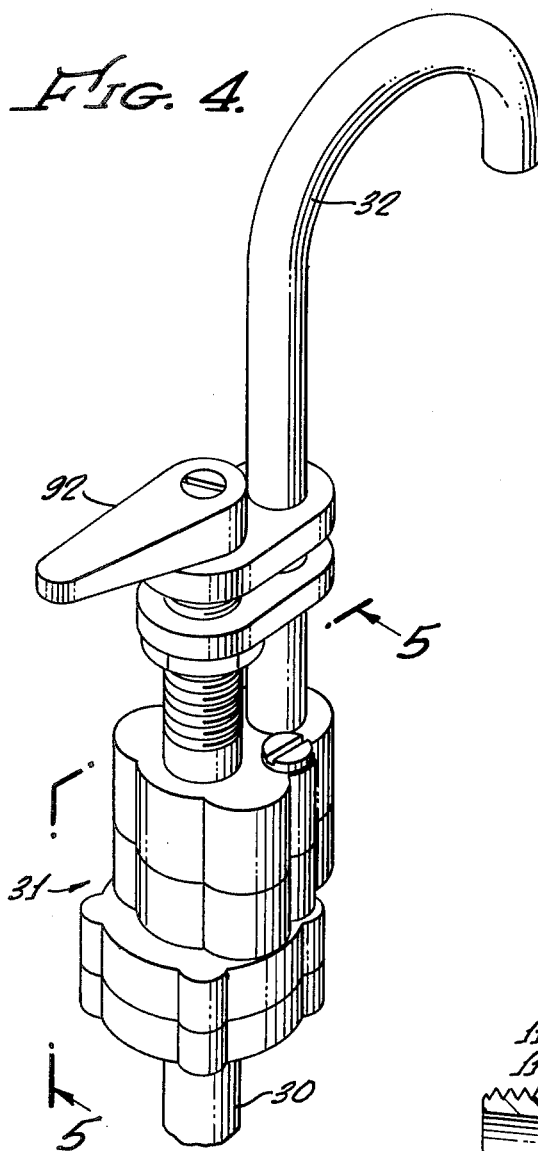
FIG. 4 is an isometric view of the outlet valve or spigot through which water is drawn at a point of use.
Figure 5:
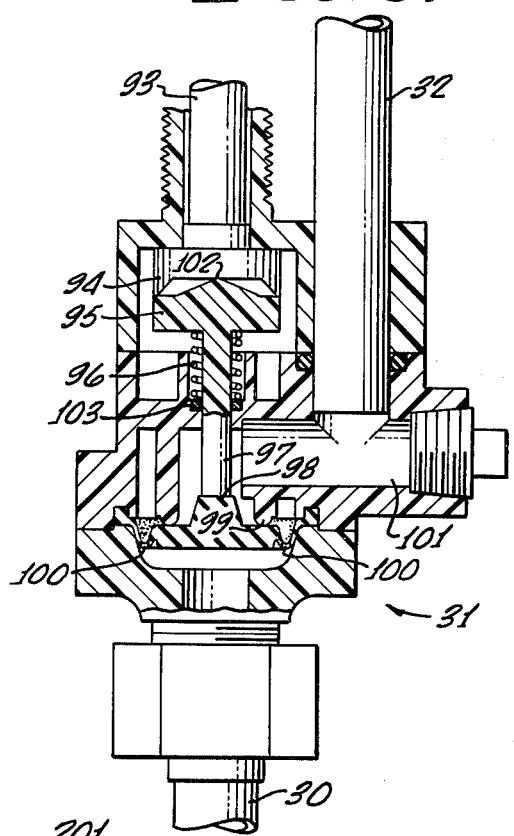
FIG. 5 is a longitudinal sectional view on line 5—5 of FIG. 4, showing the spigot in closed condition.

Referring next to the spigot (outlet valve) 31, this is usually mounted on a sink top or counter top which is indicated generally at 91 in FIG. 1. The remainder of the system is (conventionally) beneath such sink or counter. As best shown in FIGS. 4 and 5, the spigot comprises (in addition to its spout 32) a valve handle 92 which connects through a shaft 93 to an upper cam element 94. Cam element 94 is disposed vertically adjacent a cam follower 95 which is biased upwardly by helical compression spring 96. The cam follower is connected through a second shaft 97 to a diaphragm 98 adapted to seat on a seat 99 disposed thereabove. An O-ring 103 is seated below spring 96, to effectively seal the low pressures present.

The peripheral portion of diaphragm 98 has a plurality of relatively large ports or holes therein, for example four holes 100 each having a diameter of 0.125 inch. Thus, water from tube 30 can pass through these holes or ports 100 to the valve region above diaphragm 98. However, water flow is blocked when the diaphragm is seated, as shown, due to the water pressure in tube 30. Such seating occurs when the cam 94 and cam follower 95 are in a first predetermined rotated position relative to each other. When, however, shaft 93 is turned, by operation of handle 92, to change the positions of the cam and cam follower elements relative to each other, the cam follower 95 and shaft 97 are forced downwardly to shift diaphragm 98 off seat 99. Then, water can flow through holes 100 upwardly to a passage 101 and thus out spout 32.

Preferably, the upper side of cam follower 95 is shaped with inclined planes which meet at an edge 102, whereas the cam 94 is shaped in complementary manner. Thus, when the handle 92 and shaft 93 are turned, cam follower 95 is cammed downwardly as stated. The relationships are preferably such that the spigot is fully on or fully off, there being no substantial intermediate position.

DESCRIPTION OF VALVE 37 WHICH EFFECTS ACCURATE PROPORTIONING AND ALSO ADDITIONAL FLUSHING OF R.O. UNIT 10

There has been described under the previous subheadings a water purifier system which has all of the advantages described in my U.S. Pat. No. 4,021,343 and also has major additional advantages. Very importantly, and in contrast to the system described in such patent, the present system incorporates only a single tube (number 30) up to the spigot. The system described in the cited patent requires, on the other hand, at least three tubes going to the spigot. This is a tremendous advantage in all instances, especially when the tube 30 is long as when it extends between a unit and the remotely-located faucet, icemaker, etc. Not only is there but a single tube, but there need be no mechanical or electric control cables.

There will now be described a major additional element, with associated advantages and functions, in comparison to such patent and also in comparison to prior-art patents and systems of which applicant is aware. This element is the proportioning and flush valve 37, which completely solves in a simple and economical manner the problem of plugging of the very small constriction which is present in the R.O.-outlet tube for waste water.

It is emphasized that the R.O. process in home-type systems is slow. Typically, for a commercially available R.O. unit a little over a foot long, and somewhat over two inches in diameter, approximately six hours are required to generate two gallons of fresh water at 70 psi line pressure and no back pressure. Stated in another way, on the order of ten or more minutes are required to make one eight-ounce glassful of pure water. The reverse-osmosis filtration is, therefore, a drop-by-drop process.

It is important, in order to achieve proper cleaning of the membrane in R.O. unit 10 without generation of more waste water than necessary, that there be a desired proportion of waste water passing through tube 16 in comparison to the pure water passing through tube 12. (It is to be remembered that water only flows through tube 17 when spigot 31 is open). For example, the flow of waste water through tube 16 may be maintained at a level five times that of the flow of pure water through tube 12 to chamber 14. Thus, five glassfuls of water flow through valve 37 each ten-plus minutes (in the above example). This extremely slow flow is to occur despite the fact that the inlet to the valve 37 is substantially at line pressure, which may be 60, 70 or 80 psi, or even more than 100 psi.

Since there is such a slow flow through valve 37, and especially since the liquid flowing through the valve is not tap water or pure water but instead is waste water containing a relatively high proportion of contaminants, the likelihood of blockage of the necessary very small constrictive orifice is strong.

Figure 6:
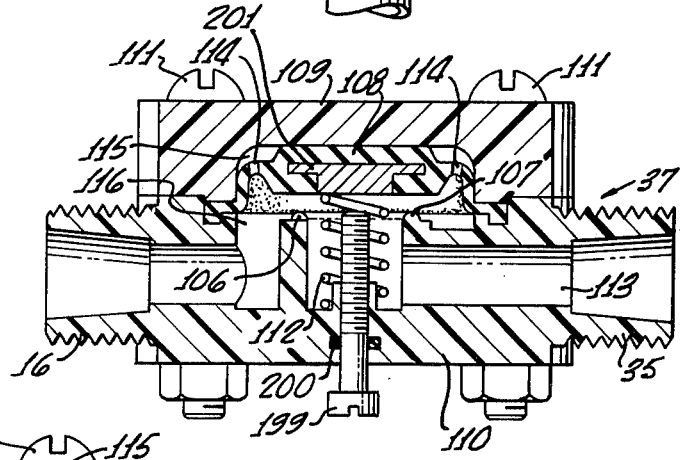
FIG. 6 is an enlarged view showing in vertical section and in open condition the self-cleaning proportioning valve which maintains the correct ratio of pure water to waste water flow through the reverse-osmosis filter unit.
Figure 6A:
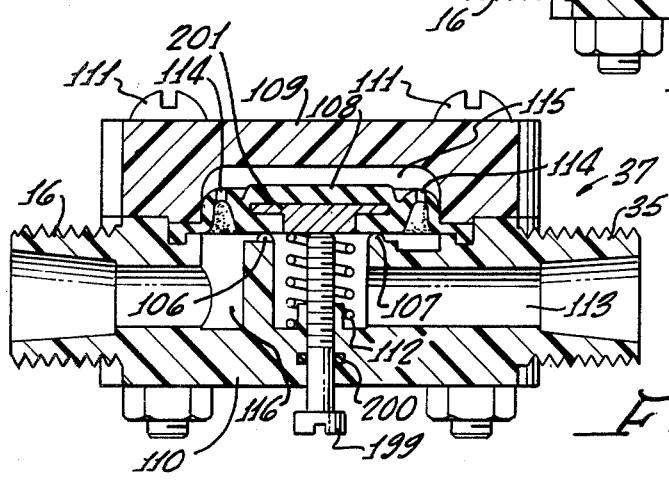
FIG. 6a corresponds to FIG. 6 but shows such proportioning valve in closed condition, a precision-area constricted flow passage then being defined.

Referring to FIGS. 6 and 6a, there is shown the valve 37 in both open and closed positions. The valve is in its closed position (FIG. 6a) at all times except during a brief period of time when the spigot 31 is first opened (while bladder 18 is full). While the valve 37 is thus "closed", it nevertheless constantly passes (bleeds or "leaks") water therethrough via a small radial groove or notch 106 formed in the valve seat 107 of the valve. As an example, this groove may be semicircular and may have a diameter of approximately 0.015 inch. The groove may be made even smaller, to produce a proportion of only a few parts (or even one part or less) waste water to one part pure water. Of course, the groove may also be made larger in order to create greater waste water flow if desired.

The groove or notch 106 is, very preferably, provided solely in seat 107.

In addition to its seat 107 containing the groove or notch 106, valve 37 comprises the diaphragm 108, preferably of the bellows type, and which is seated peripherally between adjacent housing sections 109 and 110 which are held together by bolts 111.

A compression spring 112 of helical shape is seated inwardly of and below valve seat 107, on a portion of housing section 110. A passage 113 below spring 112 connects to tube 35 and thus to the drain. The waste-outlet (brine) tube 16 connects to an annular chamber 116 which is provided around the seat 107.

Diaphragm 108 has small holes or ports 114 provided therethrough, radially-outwardly of the valve seat. For example, there may be two such ports each having a diameter of 0.025 inch. The ports 114 permit passage of water through diaphragm 108 to a chamber 115 defined thereabove.

While the inlet valve 42 is open, the R.O. unit 10 is pressurized as is the waste outlet tube 16 therefrom. This pressure is communicated to ports 114 in diaphragm 108 so that chamber 115 is filled with pressurized water to force the diaphragm downwardly onto seat 107 and "close" the valve. The valve thus being "closed", as shown in FIG. 6a, a highly constricted passageway is defined on the bottom side by the wall defining groove 106 in seat 107, and on the top side by the adjacent lower wall region of diaphragm 108. This groove is sized, as stated, to provide the correct proportioning of waste versus pure water.

Let it next be assumed that the bladder 18 becomes completely filled so that inlet valve 42 closes. The R.O. unit then depressurizes since there is outflow through the groove 106 and tube 35 to drain 22. The pure water chamber 14 is then still under pressure, but check valve 13 prevents any reverse flow of pure water into the R.O. unit. (Such valve 13 may, for example, be of the conventional type wherein a ball is spring-pressed against a seat.)

While the R.O. unit 10 and its outlet tube 16 are under a condition of substantially zero pressure, there is no substantial pressure in chamber 115 above diaphragm 108. Therefore, the spring 112 becomes operative to lift the diaphragm and cause the valve to be fully open as shown in FIG. 6. This is accompanied by a squeezing of water downwardly through the small holes or ports 114 from chamber 115 to chamber 116. Such water flow clears such ports of any particles or debris that might be present thereat.

Assuming next that spigot 31 is turned on, the inlet valve 42 opens and water flows rapidly from tube 43 to tube 11, thence through the R.O. unit to tube 16, and thence through the fully open valve 37 (FIG. 6) to tube 35 and the drain. There is no substantial constriction in this path, it being emphasized that the connection of tube 35 to tube 21 is above constriction 33.

The described unconstricted burst of water immediately cleans the groove or notch 106 of debris. This cleaning action only requires a short time period, since the water passes rapidly through even the small ports 114 into chamber 115 to pressurize the latter and force diaphragm 108 downwardly onto its seat 107 so that the constricted passageway is again defined. All of this occurs in a fraction of a second.

There is thus achieved an effective cleaning of the constricted passageway without major wastage of water. However, it is an additional advantage of the valve 37 that this short-duration rapid flow of water provides a further flushing of the R.O. unit.

Assuming that the spigot is opened at least once a day, groove 106 will be fully cleaned at least once a day since bladder 18 will (even under extreme conditions of water use) completely fill during the night. Ordinarily, there will be cleaning more than once a day since the bladder 18 will completely fill at various times during the day, and the cleaning of the groove occurs when the spigot is turned on after such complete filling of the bladder has occurred. On the other hand, it is emphasized that there is a minimum wastage of water in that valve 37 does not open each time the spigot is turned on—just when the spigot is turned on while the bladder is completely full.

The diaphragm 108 (and all of the bellows-type-diaphragms described in this application) preferably have metal inserts or discs 201 (FIGS. 6 and 6a) molded coaxially in thick central regions thereof. Thus, such central regions are rigid. An adjustable stop, in the form of a screw 199 seated by O-ring 200, is threaded through housing portion 110 coaxially of spring 112. Such screw bears, at its end, against insert 201 when the valve 37 is "closed" as shown in FIG. 6a.

The degree of closing of the diaphragm is therefore precisely controllable. This screw can accordingly be adjusted to change the precise ratio of waste-water flow to pure-water flow. Also, such adjustment compensates for deformation of the diaphragm in regions of particularly high water pressure, in that the degree of extrusion of the rubber into the groove or notch is controlled.

Referring to FIG. 6a, it is pointed out that the screw may be adjusted upwardly (from the position shown, until the diaphragm is lifted slightly off seat 107. There is then a very narrow "crack" between the seat and adjacent regions of the diaphragm, and this crack is the constricted flow path for waste water. When the screw is thus set, the groove or notch 106 may be made extremely small or even eliminated entirely. Whether or not there is a notch, there is a constricted flow path of predetermined size defined between the seat and the opposed diaphragm, which latter is the highly preferred form of movable valve element. The "predetermined" is determined at the factory, by the sizing of notch 106 and/or by the setting of screw 199. It is a major advantage of scew 199 that it may also be adjusted in the field to vary the size of the constricted flow path, for example to compensate for water pressure or water quality. Even after such adjustment, the flow path (flow area) is of precisely predetermined size.

There has thus been described a substantial number of important actions created by the highly simple and economical valve 37. It constricts to the desired extent. It is self-cleaning relative to its groove. It is self-cleaning relative to the holes in the diaphragm. It provides periodic rapid flushing of the reverse-osmosis unit.

In valve 37, the constricted passage is fully cleansed by lifting away one wall thereof and then providing a rapid cleaning action. Considered in another manner, the constricted passageway is vastly enlarged to an unconstricted passageway, each time the valve opens, the unconstricted passageway having a flow area which is a multiplicity of times the flow area of the constricted passageway.

OPERATION, EMBODIMENT OF FIGS. 1 THROUGH 6a, INCLUSIVE

Let it be assumed that the storage bladder 18 is partially empty as shown in FIG. 1. Let it also be assumed that the spigot 31 is in closed condition. All of the remaining valves are then in the positions shown in FIGS. 1, 3 and 6a—only the inlet valve 42 being open. Such inlet valve is held open by the water pressure from inlet tube 43, and by the force of springs 80 (FIG. 3) acting against piston portion 83 to hold diaphragm 55 in its elevated position. The reverse-osmosis filter unit 10 is then under pressure, but no waste water can discharge through tube 17 since squeeze valve 25 is closed.

The water which passes through the semipermeable reverse-osmosis membrane in unit 10 discharges through tube 12 and check valve 13 to the pure water chamber 14 in bladder 18. This reverse-osmosis filtering process if highly efficient because there is substantially no back pressure, squeeze chamber 20 then being open to drain 22 through tube 21. Constriction 33 is not a factor at this time since the introduction of purified water into chamber 14 occurs very slowly.

A predetermined, desired amount of "waste" water (brine) is passed continuously through the filter 10, at all times when inlet valve 42 is open as stated, to flush the same of minerals and other impurities. This flow is through tube 16 and the constricted groove or notch 106 in proportioning valve 37 (FIG. 6a). Additionally, or alternatively, where there is no groove or notch, such flow is through the very small "crack" between the opposed seat 107 and diaphragm. The waste water then passes through tube 35 and tube 21 to drain 22. Such drain may discharge to any desired point, such as a swimming pool, trees or plants to be watered, etc. Also, as bladder 18 slowly fills, squeeze water flows to drain 22 from chamber 20.

It will next be assumed that the spigot 31 is manually opened, by turning the handle 92, for example to draw a single glassful of water. Drinking water then flows through tube 30 (which is under pressure), ports 100 in diaphragm 98 (FIG. 5), and around valve seat 99 to passage 101 and spout 32. The diaphragm 98 in the spigot is then held down by shaft 97 due to the camming action present at elements 94–95.

The instant that water starts to emanate from spout 32, the pressure in tube 30 is reduced. The reduced pressure is communicated through port 41 to chamber 68 of the pilot valve 38, permitting the piston means 63 to drop and also permitting diaphragm 53 to lower and thus open the pilot valve 38. Diaphragm 53 does lower, because downward pressure is exerted thereon by pressurized water from line 17, which flows through ports 57 and 39. Water in squeeze valve 25, beneath the diaphragm 52 thereof, then drains through port 39 and tube 40 to squeeze chamber 20, which permits the pressure in tube 17 to force the squeeze diaphragm 52 downwardly and open the squeeze valve.

Squeeze water then flows through the inlet valve 42 and tube 11 to the R.O. unit, through the R.O. unit to tube 17, and through squeeze valve 25 and tube 27 to pressurize squeeze chamber 20 and squeeze downwardly on bladder 18 for flow of water from chamber 14 through tube 28 to check valve 29. The check valve diaphragm 54 is forced downwardly off its seat, permitting water to flow through the check valve to tube 30 and thence out the spout 32.

As soon as the glassful of water has been drawn, spigot 31 is turned off and flow of squeeze water immediately ceases. The amount of squeeze water which passes through tubes 17 and 27, etc., is equal to the amount of water which discharges from spout 32.

The closing of the squeeze valve 25, to effect the above-indicated cessation of squeeze water flow when the spigot 31 is turned off, is caused as follows: The rise in pressure in tube 30 (when flow stops) permits pressurized water to back up from tube 30 through the small diaphragm holes 71, to build up the pressure beneath the diaphragm and force it against seat 49, thus closing the check valve. The check valve being closed, pressurized water is trapped in line 30. The increased water pressure in line 30 is communicated through port 41 to pressure chamber 68, which acts through diaphragm 67 to force piston means 63 upwardly and thus shift diaphragm 53 against its seat 48. The pilot valve 38 is thus in closed condition and blocks drainage of water through port 39. This means that water which enters squeeze valve 25 through tube 17 will flow through the small diaphragm holes or ports 57 into the space below diaphragm 52 and will not drain therefrom. The pressure therefore builds up below the diaphragm 52 and forces it against its seat 47 to stop flow of squeeze water to chamber 20.

Since the glassful of water was drawn prior to the time that pure water chamber 14 was completely filled, the above-described operations were not accompanied by shifting of the proportioning valve 37 to the open position of FIG. 6.

It will next be assumed that a sufficient period of time elapses to permit chamber 14 to completely fill, so that the bladder 18 presses against the tank 19. Gradually, the pressure will build up (due to slow inflow from the filler unit 10) to a point that the tube 28 is under sufficient pressure to pressurize chamber 76 (FIGS. 1 and 3) through passages 74. When the pressure in such chamber 76 is sufficient to overcome the resistance created by springs 80, plus line pressure, piston 82 forces inlet valve diaphragm 55 downwardly against its seat 50, thereby shutting off the inflow of tap water.

Although there is then no inlet water pressure from the water pipe to which tube 43 is connected, pressure remains in bladder 18 and its connected tube 28. This pressure is whatever is required to close valve 42. The R.O. unit 10 is not under pressure since water drains therefrom through tubes 16, 35 and 21 to drain 22 (via the constructed passageway in valve 37). The check valve 13 prevents any reverse flow of water from chamber 14 to the R.O. unit.

Since the R.O. unit 10 is then depressurized, there is not substantial pressure acting downwardly on diaphragm 108 (FIGS. 6 and 6a) of proportioning valve 37, the result being that compression spring 112 lifts diaphragm 115 upwardly to the position of FIG. 6a, thus expelling water from chamber 115 through the small ports 114 and cleansing such ports of any debris.

Nothing then occurs until the spigot 31 is again opened to draw an additional amount of water. There is no flow of any water during this entire time interval due to the fully closed condition of inlet valve 42. When spigot 31 is opened, water pressure in tube 30 drops to permit draining of water through ports 71 (FIG. 3) of check valve 29, thus relieving the pressure beneath the diaphragm 54. Pressurized water in tube 28 forces the diaphragm off its seat so that pure water flows to tube 30 and out the spout 32.

There is then a lowered pressure in tube 28 (in comparison to pressure which was present when chamber 14 was completely filled and spigot 31 closed), and this lowered pressure is communicated through passages 74 to chamber 76, permitting springs 80 and line pressure to shift piston 82 upwardly and lift inlet valve diaphragm 55 off its seat 50 so that the inlet valve becomes fully open.

Water therefore rushes from tube 43 through tube 11 and R.O. unit 10 to tube 16, and thus to the fully-open valve 37. As described above relative to FIGS. 6 and 6a, this rush of water instantly cleans groove 106 of debris. Furthermore, the inflowing water passes through ports 114 to pressurize chamber 115 above diaphragm 108 and forces the diaphragm downwardly on its seat 107, against the pressure of spring 112.

Not only does the inlet valve 42 fully open, but the lowered pressure in tube 30 permits reopening of pilot valve 38 and thus squeeze valve 25. When spigot 31 is again closed, the increased pressure in tube 30 causes the squeeze valve 25 to close as above stated, all four valves 25, 29, 37 and 38 then being in closed condition—and inlet valve 42 being open—as indicated at the beginning of this "OPERATION" description.

The system is then back where it started, bladder 18 being partially empty and being slowly refilled through the R.O. membrane, during which time water passes through the proportioning valve 37 to drain.

Constriction 33 has a sufficiently small diameter to prevent major wastage of water when squeeze water chamber 20 is pressurized. Furthermore, the constriction 33 permits adequate squeeze pressure to be built up in chamber 20 in response to inflow through tube 27 from valve 25 (it being noted that if there were no constriction there would be no substantial squeeze pressure since water introduced into chamber 20 would merely pass out through tube 21 to the drain 22).

There will next be indicated the operation which occurs upon those rare occasions when bladder 18 is emptied completely. There will then be, temporarily, insufficient pressure built up in pressure chamber 68 (after outlet valve 31 is closed) to close the pilot and squeeze valves. Squeeze pressure thus continues to be exerted on the bladder. However, in a relatively small number of minutes the pure water from R.O. unit 10 will pressurize the collapsed bladder and its connected tube 28. Sufficient pressure will then build up in chamber 68 to cause closing of the pilot and squeeze valves. The squeeze pressure then being relieved, bladder 18 will be filled with purified water in an efficient manner. To prevent blockage, by the collapsed bladder, of pure water flow from tube 12 to tube 28, so that the described recovery can occur after complete bladder collapse, a passage or groove 140 (FIG. 1) is provided in the storage tank directly between these tubes. One or more ports 141 provide constant communication between the passage and the bladder.

EMBODIMENT OF FIGS. 7 and 8

As described above, there is (in the first embodiment) outflow of water to the drain through constriction 33 from squeeze chamber 20 during periods when spigot 31 is open. The embodiment of FIGS. 7 and 8 prevents any outflow of water to drain 22 from squeeze chamber 20 during such periods, which increases the build up of pressure in squeeze chamber 20 and is especially desirable in areas of the country where water pressure is low and water is scarce.

Except as specifically stated below, the embodiment of FIGS. 7 and 8 is identical to the embodiment previously described.

In the present embodiment, the outlet from proportioning valve 37 again passes through tube 35 directly to drain 22 (preferably via the air gap device 23). However, the outlet from squeeze chamber 20 through a tube 119 incorporating constriction 33 does not pass directly to drain 22 but instead connects to the inlet of a valve 120. Valve 120 has its outlet connected through a tube 121 to drain 22. A third port in the valve, the control port, connects through tube 122 to tube 30 leading to the spigot.

Referring to FIG. 8, the body of valve 120 is formed of injection-molded plastic elements secured together by bolts 123, there being a diaphragm 124 mounted sealingly between two adjacent ones of the housing elements. Diaphragm 124 is of the bellows type and has a plurality of ports or holes 126 formed therethrough radially-outwardly of the valve seat 127. For example, there may be four such ports each having a diameter of 0.125 inch.

A piston 129 is mounted in a chamber at the upper end of the valve, and has a small-diameter rod or stem 130 which extends slidably through an internal wall 131 and engages the upper surface of diaphragm 124. An O-ring or other seal 132 is mounted around the stem, being so small in diameter that frictional effects are minimized. A helical compression spring 133 is mounted around the rod between wall 131 and the underside of piston 129. Stated more specifically, the spring seats on O-ring 132, which in turn seats in an annular groove in wall 131.

The tube 122 from tube 30 connects to the valve above piston 129 and also above a diaphragm 150 mounted above the piston. The valve outlet 121 connects to a chamber above the first-mentioned diaphragm 124 but radially-inwardly of seat 127.

In the operation of the embodiment of FIGS. 7 and 8, at all times when spigot 31 is closed there is pressure in tube 30, and this pressure is communicated through tube 122 to the space above diaphragm 150 and piston 129. This pressure forces the diaphragm and piston downwardly, against the upwards bias of spring 133, causing rod 130 to force diaphragm 124 downwardly off its seat 127 and thus maintain the valve in open condition. Accordingly, at all times when the spigot is closed, the squeeze chamber 20 connects through orifice 33 and tube 119 to the space below diaphragm 124, further connects through ports 126 to the space above such diaphragm, and connects through the open valve to tube 121 and thus to drain 22. It follows that there is then an absence of pressure in the squeeze chamber, as is important to increase the efficiency of R.O. unit 10.

As soon as the spigot is open, pressure drops in tubes 30 and 122 and relieves the pressure above piston 129. Spring 133 then forces the piston 127 upwardly and permits diaphragm 124 to seat. Seating is effected due to the pressure then present in tube 119, such tube then being pressurized because squeeze chamber 20 is pressurized when spigot 31 is open, as above stated.

Closing of the spigot 31 reverses the procedure and again opens the valve as desired.

Valve 120 therefore prevents escape of water from chamber 20 during the period when squeeze water is introduced through the tube 27 from valve 25. This not only permits the pressure in chamber 20 to increase to a higher value, for more rapid flow of water out spout 32 for a given line pressure, but also prevents wastage of water through the constriction 33 during periods when squeezing is occurring.

MISCELLANEOUS

In the production-ready apparatus, the valve stack (FIG. 3) is preferably mounted at the top of tank 19, and with the valve axis horizontal. R.O. unit 10 is secured to one side of the tank and parallel thereto. Furthermore, the tank 19 is inverted (in comparison to what is shown in the drawings), and tubes 21 and 27 are caused to communicate with the tank interior (outside the bladder) at the same end thereof as do tubes 12 and 28 (namely, the upper end in the production-ready apparatus). The entire unit need not be vertical but may be disposed on its side.

Tube 122, FIG. 7, is preferably connected to tube 30 at a point adjacent check valve 29.

There is shown in FIG. 7, and could equally well be shown in FIG. 1, a tube 143 which connects to tube 30 at any desired part thereof. Tube 143 connects to an automatic icemaker 144, for example of the type present in household refrigerators. When the ice-mold chambers are empty, the icemaker valve suddenly opens, and pure water flows thereto for freezing into pure, clear ice. There could also be, in place of or in addition to the icemaker, a refrigerated drinking fountain. Only a single tube leads to the point of use, such tube conducting pure water therethrough. This is to be distinguished from what is shown, for example, in my prior patent—where additional tubes where required to conduct waste water (squeeze water) to the valve assembly at the spigot.

The showing of diaphragm 150 in FIG. 8 is schematic only, it being understood that such diaphragm is actually so shaped as to permit the underlying piston 129 to be forced downwardly (by pressure above the diaphragm) onto the indicated seat, which is beneath the peripheral portion of the piston.

The words "pure water" do not, of course, mean 100% pure. Typically, the water is at least about 90% pure.

For convenience, all diaphragms are, in the following claims, referred to (regardless of the orientation of the valves) as being "above" their respective seats. Conversely, the seats are "beneath" their associated diaphragms. This convention also applies to synonymous words.

The foregoing detailed description is to be clearly understood as given by way of illustration and example only, the spirit and scope of this invention being limited solely by the appended claims.

I claim:

1. A reverse-osmosis water purification system, which comprises:
  (a) a reverse-osmosis filter element,
  (b) a storage tank having movable means therein to separate said tank into a pure water chamber and a squeeze chamber,
  (c) means to conduct tap water under pressure to said filter element and to cause water to flow through said filter element into said pure water chamber,
  (d) means to conduct waste water from said filter element to a drain,
    said means (d) including proportioning means to determine the ratio of said waste water to pure water,
  (e) a single water conduit connected at one end to said pure water chamber, and adapted to be connected at the other end to an outlet valve which controls discharge of purified water to a point of use,
    said water conduit being the sole conduit between the water purification system and the region of said outlet valve,
  (f) means, including a squeeze-control valve to conduct water under pressure to said squeeze chamber, whereby to move said movable means and thus expel purified water from said pure water chamber through said single conduit to said outlet valve,
  (g) means to reduce greatly the water pressure in said squeeze chamber after closing of said squeeze-control valve,
    whereby to create a large pressure drop across said filter element, with consequent increased rate of filtration,
  (h) means to maintain substantial water pressure in said single conduit after said reduction in water pressure in said squeeze chamber, so that purified water will flow immediately out said outlet valve upon opening thereof,
  (i) means, responsive to the pressure reduction caused by said opening of said outlet valve and consequent reduction in the water pressure in said single conduit, to open said squeeze-control valve and thus effect expulsion of purified water through said single conduit to a point of use, and
  (j) means, responsive to filling of said storage tank with a predetermined quantity of purified water, to prevent flow of water through said proportioning means to said drain, whereby to prevent loss of water after a desired amount of purified water is present.

2. The invention as claimed in claim 1, in which said proportioning means comprises means to define a constricted flow path of predetermined flow area, and further comprises means to increase the flow area of such flow path and to effect relatively rapid flow of water therethrough to flush the same of deposited salts and other impurities.

3. The invention as claimed in claim 1, in which said means recited in clause (g) comprises a valve, and further comprises means to cause said valve to be closed when said outlet valve is open and to be open when said outlet valve is closed.

4. The invention as claimed in claim 1, in which said means recited in clause (j) comprises a normally open inlet valve and further comprises means responsive to a predetermined increase in water pressure in said pure water chamber to effect closing of said inlet valve, said inlet valve being connected in said means (c) upstream from said filter element.

5. The invention as claimed in claim 4, in which means are provided to bias said inlet valve toward open condition.

6. The invention as claimed in claim 1, in which said means (g) to reduce water pressure effects reduction thereof to substantially zero pressure, whereby to reduce to a minimum the back pressure acting against the membrane in said reverse-osmosis filter element.

7. The invention as claimed in claim 6, in which said pressure reduction means comprises conduit means connected to a drain, to effect drainage of water from said squeeze chamber during the time when said outlet valve is in closed condition.

8. A water purification system, comprising:
(a) a reverse-osmosis filter element,
(b) a storage tank having movable means therein to separate said tank into a pure water chamber and a squeeze chamber,
(c) means to conduct tap water under pressure to said filter element and to cause water to flow through said filter element into said pure water chamber,
(d) conduit means to conduct purified water from said pure water chamber to an outlet valve,
(e) means to introduce pressurized squeeze water into said squeeze chamber to thus expel purified water through said conduit means to said outlet valve,
(f) a squeeze-control valve incorporated in said preceding means (e), and
(g) means, responsive to the lowering of water pressure in said conduit means (d) which occurs when said outlet valve is open, to effect opening of said squeeze-control valve,
said opening of said valve causing expulsion of purified water through said conduit means and said outlet valve,
said means (g) being hydraulic and being devoid of mechanical connection to the interior of said storage tank.

9. The invention as claimed in claim 8, in which said means (g) responsive to lowering of water pressure in said conduit means includes a pilot valve connected to said squeeze-control valve.

10. The invention as claimed in claim 8, in which a check valve is provided in said conduit means (d), and in which means are provided to depressurize said squeeze chamber during periods when said outlet valve is in closed condition.

11. The invention as claimed in claim 10, in which said means (g) comprises a pilot valve responsive to the pressure present in said conduit means (d) to effect shifting of said squeeze-control valve to open condition when the pressure in said conduit means is low, and in which said squeeze-control valve and pilot valve are diaphragm valves, each having a diaphragm which seats on a valve seat.

12. The invention as claimed in claim 11, in which said squeeze-control diaphragm has small port means therethrough radially-outwardly of said valve seat, in which said pilot diaphragm is unported, in which means are provided to effect communication between said squeeze-control valve, at the side of its diaphragm remote from its seat, and said pilot valve at the region thereof radially-inwardly of and beneath its seat, said last-named means having a flow area larger than that of said port means in said squeeze-control valve diaphragm, in which pressure-responsive means are provided to force said pilot diaphragm against its seat but to permit such diaphragm to move away from its seat in response to a reduction of pressure in said pressure-responsive means, in which means are provided to effect drainage of the region of said pilot valve radially-outwardly of its seat and beneath its diaphragm, and in which means are provided to connect to the waste water outlet of said filter means a region of said squeeze valve beneath its diaphragm and radially-outwardly of its seat.

13. The invention as claimed in claim 12, in which a check valve is provided in said conduit means (d), said conduit means being a single tube, said check valve having a diaphragm which seats on a valve seat, such diaphragm having small peripheral port means therethrough, and in which means are provided to effect communication between said check valve, beneath its diaphragm and at a region radially-outwardly of its seat, and said pressure-responsive means.

14. Reverse-osmosis water purification apparatus, comprising:
(a) a reverse-osmosis filter element including a semi-permeable reverse-osmosis membrane,
(b) inlet means adapted to supply unpurified pressurized water to said filter element,
(c) outlet means adapted to discharge from said filter element waste water which did not pass through said membrane, and
(d) means provided in the waste-water flow path from said outlet means to constrict such flow path and maintain a precise desired volume ratio between said waste water and the purified water which passed through said membrane,
said means (d) comprising wall means to define a constricted flow path of predetermined small flow area,
said means (d) further comprising means automatically and intermittently operative to move one region of said wall means and thus increase the rate of waste-water flow from said outlet means to said wall means,
the movement of said region, and said increased flow, being such as to flush salts and other substances tending to clog or plug said flow path.

15. Reverse-osmosis water purification apparatus, comprising:

(a) a reverse-osmosis filter element including a semipermeable reverse-osmosis membrane, (b) inlet means adapted to supply unpurified pressurized water to said filter element, (c) outlet means adapted to discharge from said filter element waste water which did not pass through said membrane, and (d) means provided in the waste-water flow path from said outlet means to constrict such flow path and maintain a precise desired volume ratio between said waste water and the purified water which passed through said membrane, said means (d) comprising wall means to define a constricted flow path of predetermined small flow area, said means (d) further comprising means to move one region of said wall means and thus increase the rate of waste-water flow from said outlet means to said wall means, the movement of said region, and said increased flow, being such as to flush salts and other substances tending to clog or plug said flow path, said wall means defining said waste-water flow path, being provided at proximate regions of a valve seat and a movable valve element adapted to seat on said seat, the relationship being such that said constricted flow path is defined partly by said seat and partly by said movable valve element, there being means provided to shift said movable element and seat away from each other to enlarge greatly the cross-sectional area through which waste water may flow.

16. The invention as claimed in claim 15, in which said flow path is formed by a notch provided in at least one of said seat and the adjacent region of said movable valve element.

17. The invention as claimed in claim 15, in which said flow path is a thin crack between said valve seat and movable valve element.

18. The invention as claimed in claim 17, in which said movable valve element is a diaphragm, and such diaphragm has ports therethrough radially-outwardly of said seat, and in which means are provided to bias said diaphragm in a direction away from said seat.

19. Reverse-osmosis water purification apparatus, comprising:

(a) a reverse-osmosis filter element including a semipermeable reverse-osmosis membrane, (b) inlet means adapted to supply unpurified pressurized water to said filter element, (c) outlet means adapted to discharge from said filter element waste water which did not pass through said membrane, and (d) means provided in the waste-water discharge path from said outlet means to constrict the flow path and maintain a precise desired volume ratio between said waste water and the purified water which passed through said membrane, said means (d) comprising means to define a constricted waste-water flow path of predetermined small flow area, said means (d) further comprising means automatically and intermittently operative to enlarge substantially the flow area of said flow path, whereby waste water passes at increased velocity along said flow path and cleans it of salts and other substances tending to plug or clog the same, said means and the remainder of said purification apparatus being such that said waste water thus passes at increased velocity along said flow path during only a very small fraction of the time of operation of the water purification apparatus.

20. The invention as claimed in claim 19, in which said apparatus further comprises a water storage chamber for pure water, and in which said means to enlarge the flow area of said flow path comprises hydraulic means to effect such enlargement when, and only when, both of the following conditions occur simultaneously: (1) said storage tank is full of pure water, and (d) discharge of pure water from the apparatus to a point of use is commencing.

21. A reverse-osmosis water purification system, which comprises:

(a) a reverse-osmosis filter unit, (b) a storage tank including a movable element which divides said tank into a pure water chamber and a squeeze chamber, said pure water chamber receiving purified water which passed through the semipermeable membrane of said filter unit, (c) means to conduct purified water from said pure water chamber to an outlet valve, (d) means to conduct pressurized squeeze water to said squeeze chamber and thus exert force on said movable element to expel purified water to said outlet valve, (e) means to effect said flow of said squeeze water during periods when said outlet valve is in open condition, (f) means to create a depressurizing path from said squeeze chamber when said outlet valve is in closed condition, thus increasing the pressure drop across said membrane for increased filtering speed, and (g) means to block said depressurizing path while said outlet valve is in open condition.

22. The invention as claimed in claim 21, in which said means (g) comprises means responsive to opening of said outlet valve to block said depressurizing path and further responsive to closing of said outlet valve to re-establish said depressurizing path.

23. The invention as claimed in claim 21, in which said means (e) comprises a diaphragm-type squeeze valve and a diaphragm-type pilot valve connected to each other, said pilot valve being responsive to a low-pressure condition in said means (c) and to then effect opening of said squeeze valve.

24. The invention as claimed in claim 23, in which a check valve is provided in said means (c) to maintain the pressure at said outlet valve after said squeeze chamber has been depressurized.

25. The invention as claimed in claim 21, in which said means (g) comprises a valve incorporating a diaphragm which seats on a valve seat, there being ports in said diaphragm radially-outwardly of said seat, in which a piston is provided in said valve and has a stem which seats on the underside of said diaphragm, in which spring means are provided to bias said piston in a direction away from said diaphragm, in which a chamber is defined in said valve on the side of said piston remote from said diaphragm, said chamber being connected to said means (c) for conducting purified water to said outlet valve, in which the portion of said valve above said diaphragm is connected to said squeeze chamber, and in which the portion of said valve beneath said diaphragm and radially-inwardly of said seat is connected to a drain.

26. A reverse-osmosis water purification system, which comprises:
(a) a reverse-osmosis water filter unit having an inlet adapted to be connected to a water pipe containing tap water under pressure,
(b) a storage tank having a bladder therein,
the chamber within said bladder being a pure water chamber and being connected to the purified water outlet of said filter unit,
the chamber within said tank exteriorly of said bladder being a squeeze chamber and being connected to the waste-water outlet of said filter unit,
(c) a squeeze valve connected to control flow of waste water from said waste water outlet to said squeeze chamber,
(d) a single conduit connecting said pure water chamber to an outlet valve through which purified water is to be dispensed to a point of use,
(e) a check valve provided in said single conduit to maintain pure water pressure at said outlet valve during periods when said squeeze chamber is not under pressure,
(f) means to depressurize said squeeze chamber during periods when said outlet valve is in closed condition,
said means being adapted to permit build-up of squeeze pressure in said squeeze chamber during periods when said squeeze valve is open so that waste water then flows to said squeeze chamber to pressurize the same,
(g) means responsive to the reduction in pressure in said single conduit, which reduction occurs when said outlet valve is open, to open said squeeze valve and thus pressurize said squeeze chamber,
said means (g) being hydraulic and being devoid of mechanical connection to the interior of said storage tank, and
(h) valve means responsive to filling of said bladder to a predetermined extent, to prevent further flow of water through the system until said outlet valve is again opened.

27. The invention as claimed in claim 26, in which said means (g) comprises a diaphragm-type pilot valve connected to said squeeze valve, said pilot valve being responsive to said pressure reduction to effect opening of said squeeze valve for flow of squeeze water to said squeeze chamber.

28. The invention as claimed in claim 26, in which said valve means (h) comprises a normally open valve which is open at all times except when said bladder is filled to said predetermined extent, and further comprises spring means to bias said valve toward open condition, said normally open valve including a movable valve element which is further urged toward open condition by inlet water pressure.

29. A water purifier system, which comprises:
(a) a reverse-osmosis water purifier element having inlet means for pressurized tap water, outlet means for purified water, and outlet means for waste water,
(b) a pressure-resistant storage tank having a bladder therein,
the region of said tank within said bladder being a pure water chamber,
the region of said tank exterior to said bladder being a squeeze chamber,
(c) a diaphragm-type squeeze valve having a diaphragm which seats on a valve seat,
said diaphragm having small port means therethrough radially-outwardly of said seat,
(d) a diaphragm-type pilot valve having an unported diaphragm which seats on a valve seat,
(e) means to effect communication between said squeeze valve, at the side of its diaphragm remote from its seat, and said pilot valve at the region thereof radially-inwardly of and beneath its seat,
said means (e) having a flow area larger than that of said port means in said squeeze-valve diaphragm,
(f) pressure-responsive means, including a first pressure chamber, to force said pilot-valve diaphragm against its seat, but to permit such diaphragm to move away from its seat in response to a reduction in pressure in said first pressure chamber,
(g) a check valve having a diaphragm which seats on a valve seat,
said diaphragm having small port means therethrough radially-outwardly of the valve seat,
(h) means to effect communication between said check valve, at the same side of its diaphragm as said seat but at a region radially-outwardly of its seat, and said first pressure chamber,
(i) a single tube connected between an outlet valve and the same part of said check valve specified in clause (h),
(j) an inlet valve having an unported diaphragm which seats on a valve seat,
(k) means, including a second pressure chamber, to force said inlet-valve diaphragm against its seat in response to an increased pressure in said second chamber,
(l) means to effect communication between said second pressure chamber and the inlet to said check valve,
said check-valve inlet being radially-inwardly of and beneath its seat,
(m) means to connect pressurized tap water to said inlet valve at the region thereof radially-inwardly of and beneath its seat,
(n) means to connect to said purifier inlet means the region of said inlet valve beneath its diaphragm and radially-outwardly of its seat; and to connect to said pure water chamber said inlet to said check valve; and to connect to said squeeze chamber the region of said squeeze valve beneath its diaphragm and radially-inwardly of its seat; and to effect drainage of the region of said pilot valve radially-outwardly of and beneath its seat; and to connect to said purifier waste-water outlet means the region of said squeeze valve beneath its diaphragm and radially-outwardly of its seat; and to connect to said pure water chamber said pure water outlet means of said purifier; and
(o) means to depressurize said squeeze chamber during periods when said outlet valve is closed.

30. The invention as claimed in claim 29, in which means, additional to the pressure exerted by inlet water, are provided to bias said inlet valve diaphragm in a direction away from its seat.

31. The invention as claimed in claim 29, in which said depressurizing means (o) comprises a constricted passageway leading to a drain.

32. The invention as claimed in claim 29 in which said depressurizing means (o) comprises valve means, said valve means including means to maintain the same in open condition when the water pressure in said single tube is high and to maintain the same in closed condition when the water pressure in said single tube is low.

33. The invention as claimed in claim 29, in which said portion of clause (n) comprising the means to effect drainage of the region of said pilot valve radially-outwardly of and beneath its seat comprises a connection to said squeeze chamber.

34. The invention as claimed in claim 29, in which means, including constriction means, are provided to connect to a drain said purifier outlet means for waste water.

35. The invention as claimed in claim 34, in which said constriction means comprises a diaphragm valve incorporating a diaphragm which seats on a valve seat, said diaphragm including small port means therethrough radially-outwardly of said seat, the side of said diaphragm remote from said seat being a closed chamber except for said port means, in which spring means are provided to bias said diaphragm in a direction away from its seat, in which the region of said valve beneath its diaphragm and radially-inwardly of its seat is connected to drain, and in which the region of said valve beneath its diaphragm but radially-outwardly of its seat is connected to said waste water outlet means of said purifier.

36. The invention as claimed in claim 29, in which the housings of said various diaphragm valves are injection molded of plastic.

* * * * *